United States Patent
Stolte et al.

(10) Patent No.: US 6,798,522 B2
(45) Date of Patent: Sep. 28, 2004

(54) WAVELENGTH MEASUREMENT ADJUSTMENT

(75) Inventors: Ralf Stolte, Hamburg (DE); Peter Thoma, Rottenburg (DE); Emmerich Mueller, Aidlingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 133 days.

(21) Appl. No.: 09/922,115

(22) Filed: Aug. 3, 2001

(65) Prior Publication Data

US 2002/0149779 A1 Oct. 17, 2002

(30) Foreign Application Priority Data

Apr. 12, 2001 (EP) .......................................... 01109135

(51) Int. Cl.$^7$ ................................................ G01B 9/02
(52) U.S. Cl. ................................................... 356/477
(58) Field of Search .................................... 356/477

(56) References Cited

U.S. PATENT DOCUMENTS 5,450,207 A 9/1995 Fomenkov .................. 356/416
5,978,391 A 11/1999 Das et al.
2002/0131045 A1 9/2002 Anderson .................... 356/436
2002/0163646 A1 11/2002 Anderson .................... 356/477

FOREIGN PATENT DOCUMENTS

| EP | 1041373 A2 | 4/2000 |
| GB | 2280261 A | 1/1995 |
| WO | WO 98/36252 | * 8/1998 |

* cited by examiner

Primary Examiner—Samuel A. Turner
Assistant Examiner—Michael A. Lyons

(57) ABSTRACT

A wavelength-determining unit for determining the wavelengths of a plurality of successive optical signals $\lambda(t)$ includes a wavemeter unit for determining first wavelength values $\lambda 1(t)$ for the optical signals $\lambda(t)$. An absolute-measuring unit having unambiguous wavelength properties at known absolute wavelength values determines second wavelength values $\lambda 2(t)$ as such of the known absolute wavelength values covered by the optical signals $\lambda(t)$. An evaluation unit receives the determined first $\lambda 1(t)$ and second $\lambda 2(t)$ wavelength values and provides forcorrected wavelength values $\lambda 1'(t)$ based on a comparison of the determined first $\lambda 1(t)$ and second $\lambda 2(t)$ wavelength values.

10 Claims, 2 Drawing Sheets

WAVELENGTH MEASUREMENT ADJUSTMENT

BACKGROUND OF THE INVENTION

1. Field of the Invention

The present invention relates to determining the wavelength of an optical beam.

2. Discussion of the Background Art

Determining the wavelength of optical signals is common object in optical applications. A description of the most common principles for determining the wavelength is given in the pending European Patent Application 00117607.2-2217 and the teaching thereof is incorporated herein by reference.

It is clear that the accuracy of such wavemeters directly affects the accuracy of the entire measurement. Typical sources for inaccuracies are electrical, and/or mechanical, and/or environmental variations (temperature, air pressure, and gravity).

In order to improve accuracy, tunable laser sources or wavemeters are usually calibrated in certain intervals e.g. at a factory site with devices having known wavelength characteristics.

Although calibration usually improves the accuracy of the measurement, it is clear that the sources of inaccuracy mentioned above still persist after the calibration and will still adversely affect the wavelength accuracy. Another disadvantage, of course, results from the additional effort that has to be spent for the calibration process.

SUMMARY OF THE INVENTION

It is an object of the present invention to further improve accuracy for wavelength measurements. The object is solved by the independent claims. Preferred embodiments are shown by the dependent claims.

According to the invention, a wavelength-determining unit for determining the wavelengths of a plurality of successive optical signals comprises a wavemeter unit, an absolute-measuring unit having unambiguous wavelength properties at known absolute wavelength values, and an evaluation unit. The wavemeter unit determines (e.g. successive) wavelength values for the optical signals. The absolute-measuring unit determines such of the known absolute wavelength values covered by the optical signals. Both devices—the wavemeter and the absolute measuring unit—receive the same optical signals and run substantially simultaneously.

The evaluation unit receives the determined wavelength values from the wavemeter unit and the covered known absolute wavelength values from the absolute-measuring unit. The evaluation unit compares the determined wavelength values from the wavemeter with the covered known absolute wavelength values, and corrects the determined wavelength values based on the covered known absolute wavelength values.

Thus, the invention provides a correction or adjustment of the measuring results that is suitable to provide an online correction. Such simultaneous calibration of wavelength values provides strong improvements in comparison to single factory site calibrations, which cannot cover individual conditions of the setup and environment during measurement. This is in particular useful when the measurement setup, in particular the wavemeter unit, is susceptible for variations, e.g. by thermal or mechanical influences, which can affect the measuring conditions and/or accuracy.

In a preferred embodiment, the wavemeter unit has a wavelength characteristic known in principle or derived from former measurements. In that case, the evaluation unit adjusts the known wavelength characteristic based on the covered known absolute wavelength values, and corrects the determined wavelength values accordingly.

The correction of the determined wavelength values or the wavelength characteristics of the wavemeter is preferably accomplished by correlating the covered known absolute wavelength values with determined wavelength values or with the wavelength characteristics of the wavemeter unit, e.g. by comparing the covered known absolute wavelength value with the wavelength values determined by the wavemeter unit for the same optical signal. The evaluation unit can then determine one or more offset and/or corrections values for correcting the determined wavelength values or for calibrating the wavelength characteristics of the wavemeter unit.

The absolute-measuring unit makes use of unambiguous wavelength properties like absolutely known transmission features as provided e.g. by gas absorption cells. In such gas absorption cells, the incoming light is passed through a gas cell acting as an optical filter having known absorption lines of the gas as absolutely known transmission features. Such filters are described e.g. in U.S. Pat. No. 5,780,843 for controlling high accuracy tunable laser sources.

A preferred embodiment of the wavemeter unit makes use of the interferometric principle, such as the Fizeau, Michelson or Fabry-Perot interferometer or uses e.g. a combination of different etalons (which can be also realized based on polarization effects) as disclosed in detail in the aforementioned EP-A-875743. Those interferometric units generally provide a periodic dependency over the wavelength, but exhibit a higher resolution than the units employing wavelengths dependent material properties.

For providing the wavelength correction of the invention, the optical signals are swept over a wavelength range wherein the absolute-measuring unit has at least one of the known absolute wavelength characteristics. By analyzing the measured transmitted power of the absolute-measuring unit together with the wavelength-results derived from the wavemeter unit, a relation between the absolutely known transmission features and the derived wavelength-results can be established. This can result for example in one or more correction values (offset, polynomial coefficients) relating to an e.g. factory based calibration of the wavemeter unit. Because this online calibration reflects the instantaneous measurement conditions it is more accurate than a timely and geographically separated factory based calibration could ever be.

In another embodiment, a separate wavelength source is employed providing optical signals out of the sweep band. The interference path difference in an interferometer of the wavemeter can thus be measured or controlled. This, however, is not applicable for dispersion drift and a very frequency stable source is needed.

The invention can be partly or entirely embodied by one or more suitable software programs, which can be stored on or otherwise provided by any kind of data carrier, and which might be executed in or by any suitable data processing unit. In particular, software programs might be applied by the evaluation unit and for controlling a wavelength sweep of a light source.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
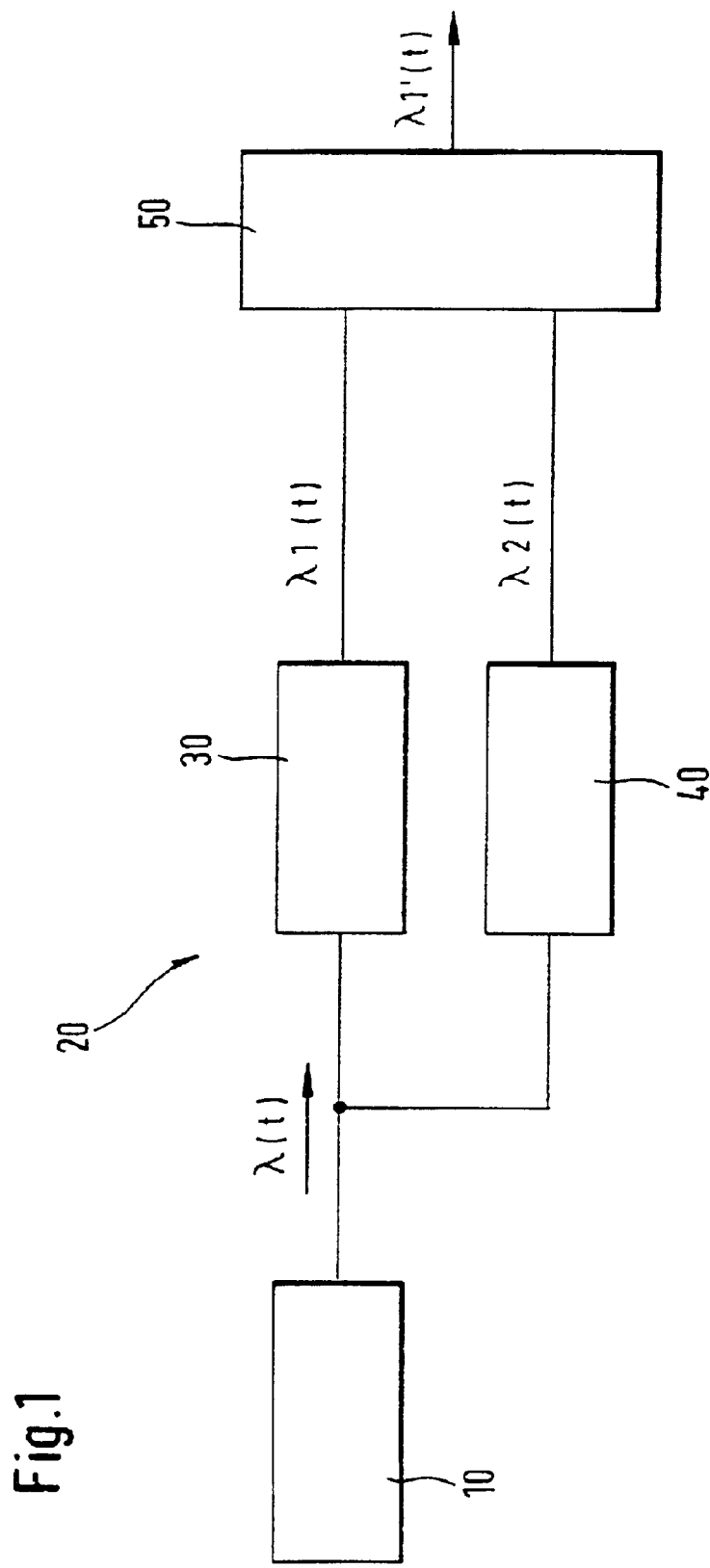
FIG. 1 shows a principle arrangement according to the invention.

In FIG. 1, a wavelength variable laser source 10 provides an optical signal $\lambda(t)$ having a wavelength variation over the time. The exact variation of the wavelength over time has to be determined. The optical signal $\lambda(t)$ is coupled to a wavelength-determining unit 20 comprising a wavemeter unit 30, an absolute-measuring unit 40 having unambiguous wavelength properties at known absolute wavelength values, and an evaluation unit 50. The wavemeter unit 30 determines wavelength values $\lambda 1(t)$ for the optical signal $\lambda(t)$. The absolute-measuring unit 40 determines such of the known absolute wavelength values $\lambda 2(t)$ covered by the optical signal $\lambda(t)$. The evaluation unit 50 receives the determined wavelength values $\lambda 1(t)$ from the wavemeter unit 30 and the covered known absolute wavelength values $\lambda 2(t)$ from the absolute-measuring unit 40. The evaluation unit 50 compares the determined values of $\lambda 1(t)$ with the covered known absolute wavelength values $\lambda 2(t)$, and provides corrected wavelength values $\lambda 1'(t)$ for determined values of $\lambda 1(t)$ based on the covered known absolute wavelength values $\lambda 2(t)$.

If the known absolute wavelength characteristic is provided i.e. by a gas cell, covered absorption peaks marked by an index i lead to discrete absolute wavelength values $\lambda 2$ at the sweep times $t_i$. Deviations of the relative wavemeter values $\lambda 1$ from the absolute peak values $\lambda 2$ at the same point in time describe a wavelength error $\Delta\lambda(t_i)=\lambda 1(t_i)-\lambda 2(t_i)$. The discrete function $\Delta\lambda$ can be inter- and extra-polated by a polynomial regression of order one or higher giving a steady function $\Delta\lambda(t)$.

The desired calibrated wavelength $\lambda 1$ as a function of the sweep time t can be unveiled by a subtraction of the wavelength error $\Delta\lambda(t)$ from the wavelength values $\lambda 1(t)$: $\lambda 1'(t)=\lambda 1(t)-\Delta\lambda(t)$. In this way the fine structure of the sweep signal relatively determined by the wavemeter is calibrated by the discretely known absolute wavelength reference. If a second order polynomial fit is deployed for the inter- and extrapolation of $\Delta\lambda(t_i)$ the typical dispersion influence of the fiber material of the wavemeter is eliminated. These calculations are part of the evaluation unit 50.

Figure 2:
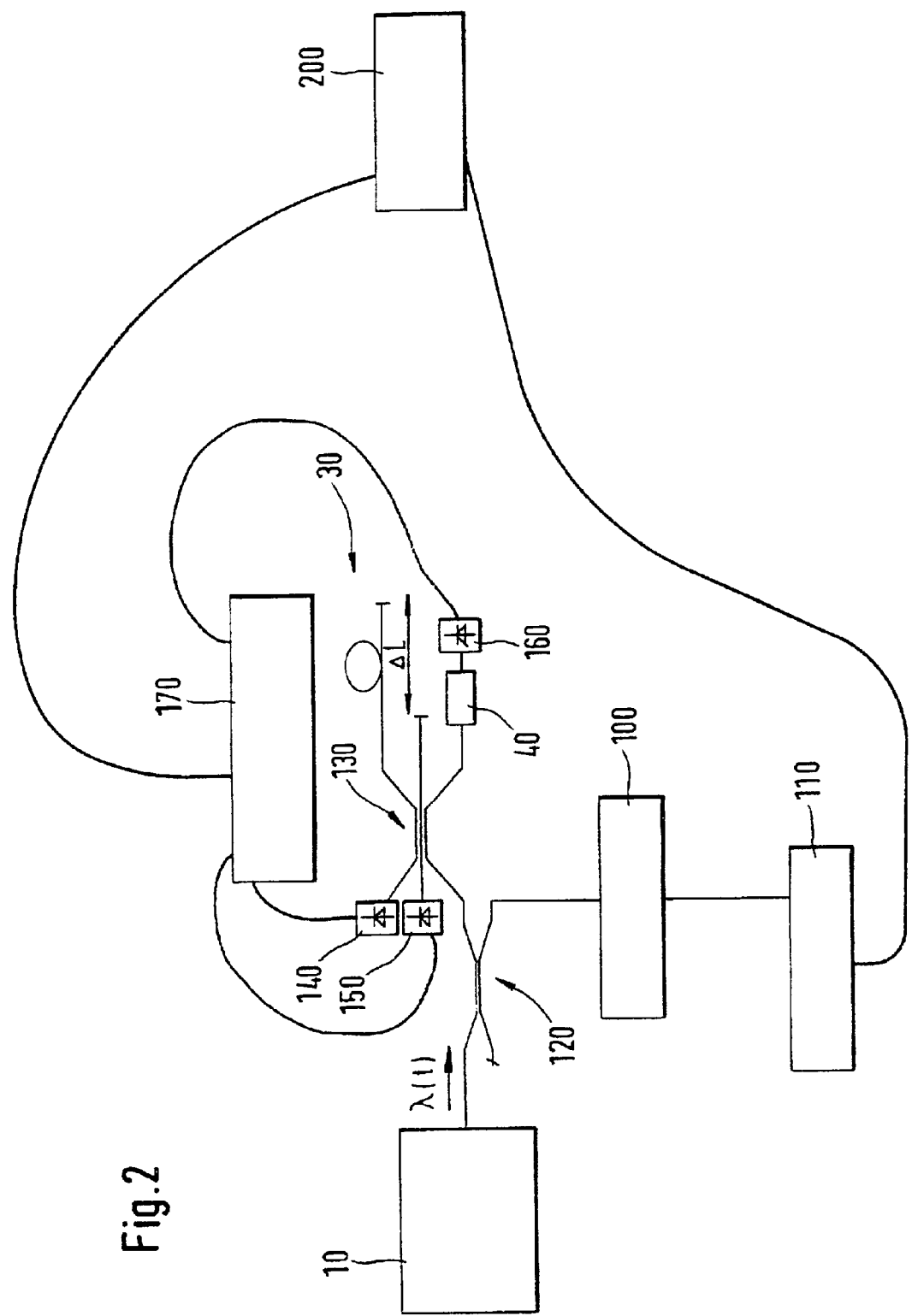
FIG. 2 shows a preferred embodiment according to the invention.

FIG. 2 shows a preferred embodiment according to the invention for testing an optical component 100 with a swept tunable laser (TLS) 10 and a receiver 110 receiving a signal response of the optical component 100 on the stimulus signal provided by the TLS 10. A coupler 120 provides the optical signal $\lambda(t)$ of the TLS 10 to a Michelson Fiber Interferometer (MFI) 130 with two delay lines. The mixing product is phase-shifted and detected by detectors 140 and 150, thus enabling direction-sensitive tracking.

At the detector 140 the wavelength dependent signal described by the well-known interferogram equation is observed. An additional phase-shifted detector 150 might be used to enable direction-sensitive tracking. Insofar, the MFI 130 represents the wavemeter unit 30. Both interferometric arms have to be protected against environmental disturbances (mainly vibrations) causing systematical and statistical phase fluctuations ending up in a reduced relative and absolute wavelength accuracy.

A third port of the MFI 130 is used for absolute wavelength determination, thus representing the absolute-measuring unit 40. To achieve this an absolute wavelength reference with defined absorption lines is used to generate a wavelength dependent Trace Signal at a detector 160.

It has been shown that the interference signal of the MFI 130 and therefore the wavelength information is affected by systematical and statistical phase fluctuations in the interferometer paths. Root causes include accousto-optic or temperature sensitive propagation constant drift, stress relaxation. These effects affect the relative and the absolute wavelength accuracy.

In operation, a controller 170 receives takes the data from the detectors 110, 140, (150,) and 160. From the data of the detectors 140 and 160, the wavelength values $\lambda 1'(t)$ as a function of time are evaluated in 170 (see also unit 50 in FIG. 1) and linked to the intensity values $I(t)$ of the detector 110 resulting in the spectral response $I(\lambda)$ of the optical component 100: $\lambda 1'(t)$ & $I(t) \rightarrow I(\lambda)$.

Every time when the optical signal $\lambda(t)$ sweep covers one or more absorption lines (wavelength marks) of the absolute-measuring unit 40, the controller 170 can determine an absolute wavelength offset, wavelength dependent frequency spacing of the MFI 130 (e.g. CD: 3 points), and the phase difference of the MFI 130 at a given wavelength spacing. This can be done e.g. by using LSA fit to a reference function or determining cross-correlation.

If a counter is used, the result of the calculation of the correction value can be an error polynom with updated coefficients. This polynom can be recalculated with any sweep.

If the measurement sweep does not cover wavelength marks of the absorption cell it could be extended at the cost of sweep time. This can be repeated in intervals depending on the time behavior of the phase fluctuations.

An evaluation unit 200 in FIG. 2 receives the signal response determined by the receiver 110 and the thereto corresponding determined wavelength values $\lambda 1'(t)$ from the controller 170.

What is claimed is:

1. A wavelength-determining unit for determining the wavelengths of a plurality of successive optical signals $\lambda(t)$ having a wavelength variation over time, comprising:

a wavemeter unit which determines first wavelength values $\lambda 1(t)$ having a wavelength variation over time for the optical signals $\lambda(t)$, an absolute-measuring unit having unambiguous wavelength properties at known absolute wavelength values, and which determines second wavelength values $\lambda 2(t)$ having a wavelength variation over time as such of the known absolute wavelength values covered by the optical signals $\lambda(t)$, and an evaluation unit which receives said first $\lambda 1(t)$ and second $\lambda 2(t)$ wavelength values and generates corrected wavelength values $\lambda 1'(t)$ having a wavelength variation over time based on a comparison of the determined first $\lambda 1(t)$ and second $\lambda 2(t)$ wavelength values over time.

2. The wavelength-determining unit of claim 1, wherein the wavemeter unit has a wavelength characteristic known in principle or derived from former measurements, whereby the evaluation unit adjusts the known wavelength characteristic based on the determining second wavelength values $\lambda 2(t)$.

3. The wavelength-determining unit of claim 1, wherein the evaluation unit comprises a correlation unit for correlating the determined first wavelength values $\lambda1(t)$ with the second wavelength values $\lambda2(t)$.

4. The wavelength-determining unit of claim 1, wherein the evaluation unit determines at least one of one or more offset or correction values for correcting the determining first wavelength values $\lambda1(t)$ to the corrected wavelength values $\lambda1'(t)$.

5. The wavelength-determining unit of claim 1, wherein the wavemeter unit comprises an interferometer.

6. The wavelength-determining unit of claim 1, wherein the absolute-measuring unit comprises a gas absorption cell.

7. A measuring unit for measuring an optical characteristic of a device under test, comprising:

a wavelength variable laser source which provides an optical signal $\lambda(t)$ to the device under test, the optical signal $\lambda(t)$ having a wavelength variation over the time;

a wavelength-determining unit which receives the optical signal $\lambda(t)$ and determines wavelength values $\lambda1(t)$ thereof over the time, said wavelength determining unit comprising a wavemeter unit which determines first wavelength values $\lambda1(t)$ having a wavelength variation over time for the optical signals $\lambda(t)$, an absolute-measuring unit having unambiguous wavelength properties at known absolute wavelength values, and which determines second wavelength values $\lambda2(t)$ having a wavelength variation over time as such of the known absolute wavelength values covered by the optical signals $\lambda(t)$, and a first evaluation unit which receives the determined first $\lambda1(t)$ and second $\lambda2(t)$ wavelength values having a wavelength variation over time and provides corrected wavelength values $\lambda1'(t)$ having a wavelength variation over time based on a comparison of the determined first $\lambda1(t)$ and second $\lambda2(t)$ wavelength values;

a receiver for receiving a signal response on the optical signal $\lambda(t)$ provided to the device under test; and a second evaluation unit which receives the signal response and the corresponding determined wavelength values $\lambda1'(t)$ having a wavelength variation over time.

8. A measuring unit for measuring an optical characteristic of a device under test, comprising:

a wavelength variable laser source which provides an optical signal $\lambda(t)$ to the device under test, the optical signal $\lambda(t)$ having a wavelength variation over the time, a wavelength-determining unit which receives the optical signal $\lambda(t)$ and determining relative wavelength values $\lambda1(t)$ having a wavelength variation over time and absolute wavelength values $\lambda2(t)$ thereof over the time, a receiver which receives a signal response I(t) on the optical signal $\lambda(t)$ provided to the device under test, and an evaluation unit which receives the signal response of the receiver and which calculates the corresponding wavelength values $\lambda1'(t)$ having a wavelength variation over time out of the wavelength values $\lambda1(t)$ and $\lambda2(t)$ from the wavelength-determining unit resulting in a spectral response $I(\lambda)$ of the device under test.

9. A method for determining the wavelengths of a plurality of successive optical signals $\lambda(t)$, comprising:

determining first wavelength values $\lambda1(t)$ having a wavelength variation over time for the optical signals $\lambda(t)$, using an absolute-measuring unit having unambiguous wavelength properties at known absolute wavelength values for determining second wavelength values $\lambda2(t)$ having a wavelength variation over time as such known absolute wavelength values covered by the optical signals $\lambda(t)$, and providing corrected wavelength values $\lambda1'(t)$ having a wavelength variation over time based on a comparison of the determined first $\lambda1(t)$ and second $\lambda2(t)$ wavelength values.

10. A software product, stored on a data carrier, for executing a method for determining the wavelengths of a plurality of successive optical signals $\lambda(t)$, when run on a data processing system such as a computer, said method comprising:

determining first wavelength values $\lambda1(t)$ having a wavelength variation over time for the optical signals $\lambda(t)$, using an absolute-measuring unit having unambiguous wavelength properties at known absolute wavelength values for determining second wavelength values $\lambda2(t)$ having a wavelength variation over time as such known absolute wavelength values covered by the optical signals $\lambda(t)$, and providing corrected wavelength values $\lambda1'(t)$ having a wavelength variation over time based on a comparison of the determined first $\lambda1(t)$ and second $\lambda2(t)$ wavelength values.

* * * * *